W. H. FOSTER.
DRIFTING VALVE FOR LOCOMOTIVES.
APPLICATION FILED FEB. 2, 1915.
1,137,201.
Patented Apr. 27, 1915.
3 SHEETS—SHEET 1.
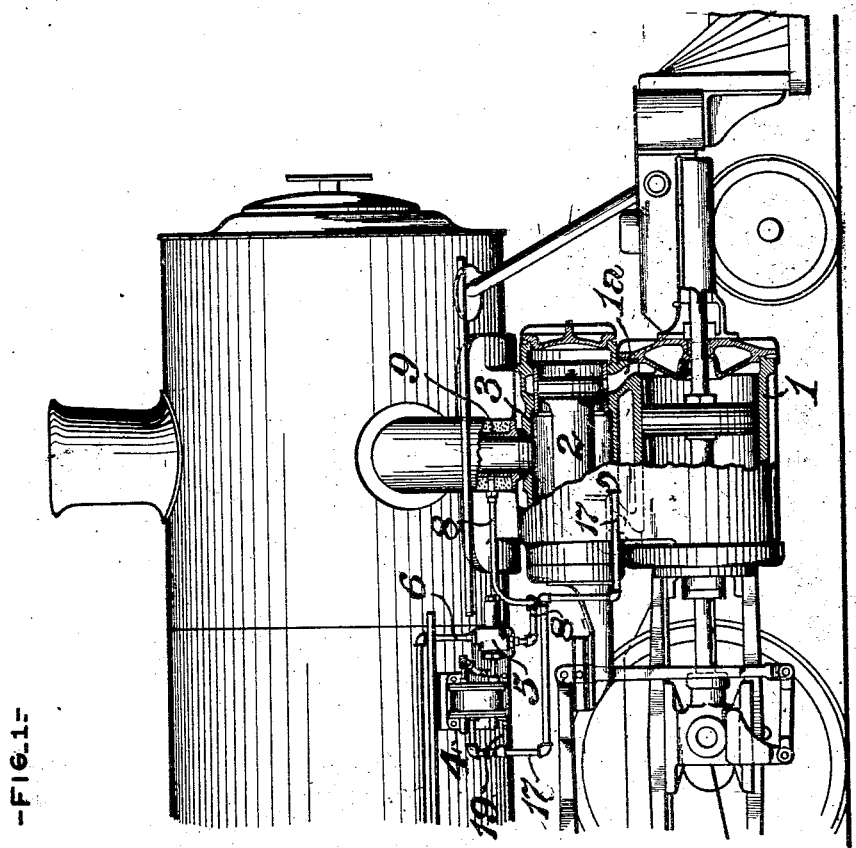
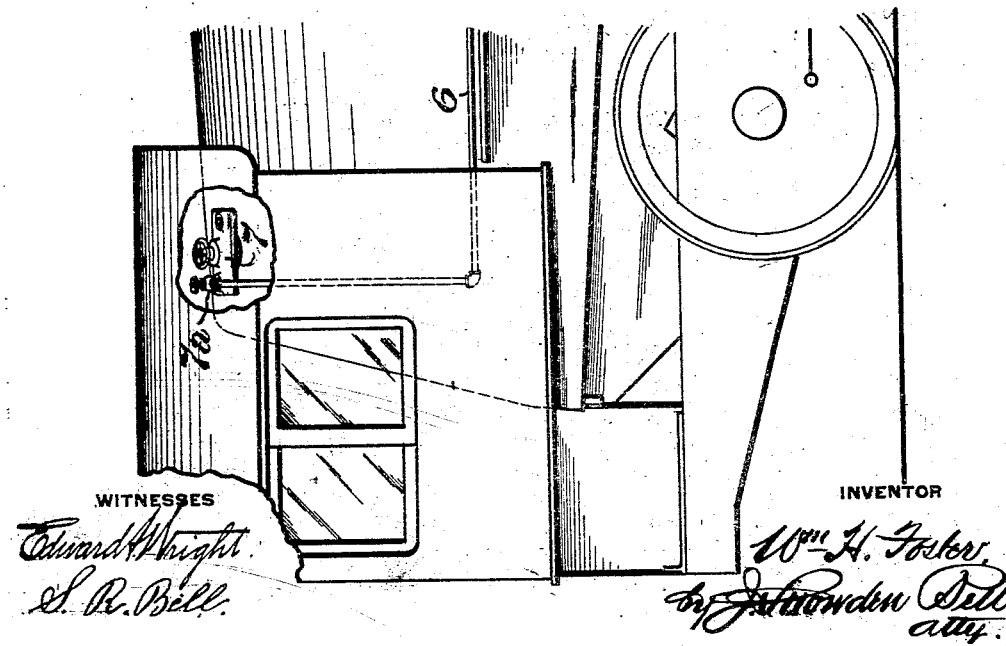
WITNESSES
INVENTOR

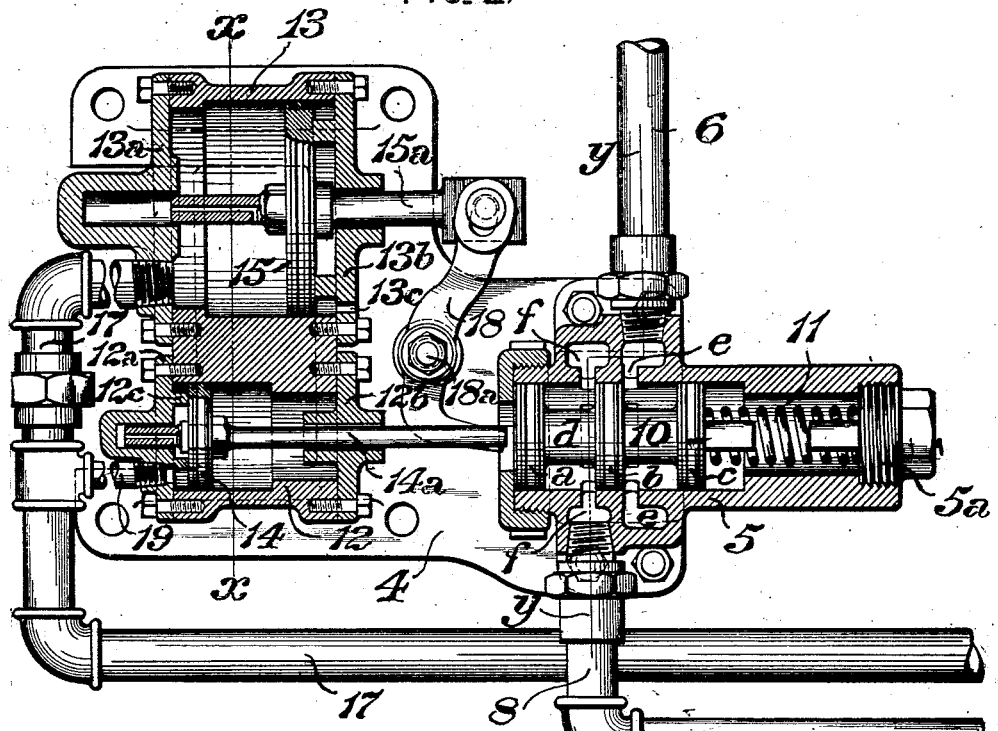
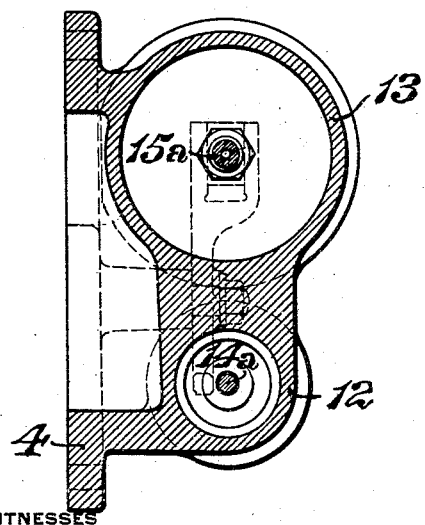
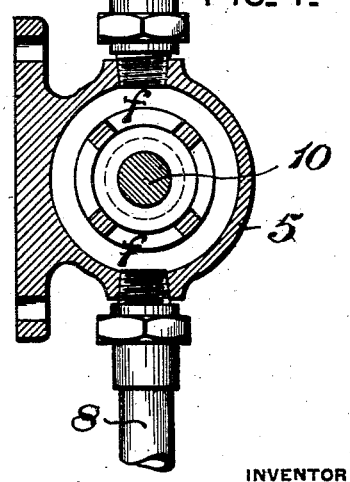

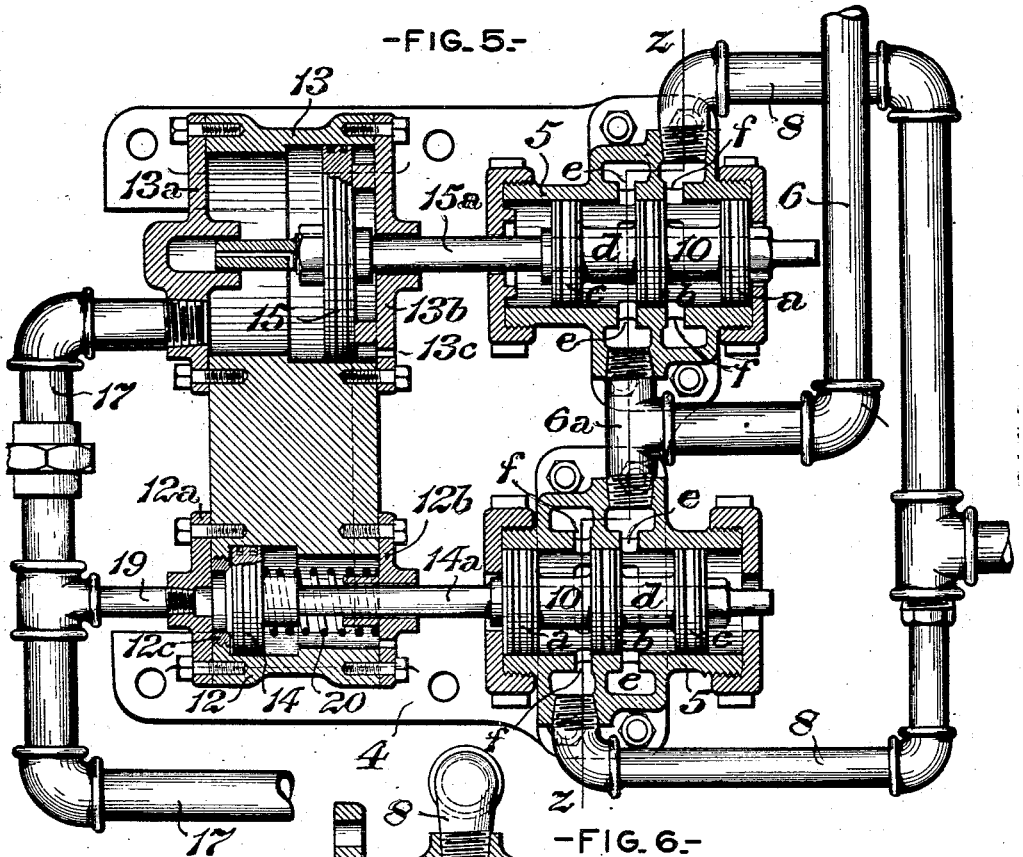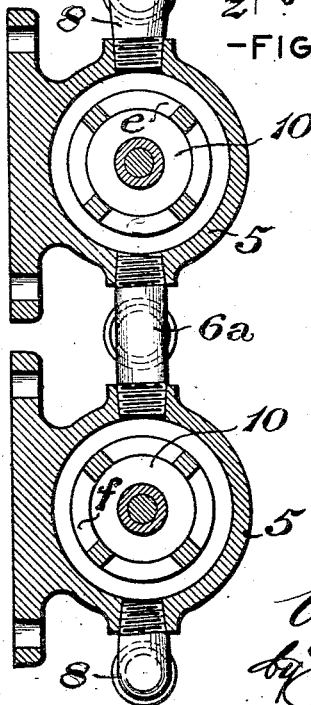

UNITED STATES PATENT OFFICE.

WILLIAM H. FOSTER, OF FLUSHING, NEW YORK.

DRIFTING-VALVE FOR LOCOMOTIVES.

1,137,201.   Specification of Letters Patent.   Patented Apr. 27, 1915.

Application filed February 2, 1915.   Serial No. 5,632.

*To all whom it may concern:*

Be it known that I, WILLIAM H. FOSTER, of Flushing, in the county of Queens and State of New York, have invented a certain new and useful Improvement in Drifting-Valves for Locomotives, of which improvement the following is a specification.

The object of my invention is to provide simple and effective means, of ready applicability in locomotive engines of the various present standard constructions, particularly those operated by superheated steam, whereby the formation of a vacuum in the cylinders, when the throttle valve is closed, will be automatically prevented, thereby preventing dust and cinders from being drawn into the cylinders when the locomotive is "drifting," or running with throttle closed, and proper lubrication of the cylinders will be insured and carbonization of oil therein prevented, by causing a limited amount of steam to be passed through them continuously during operation.

The improvement claimed is hereinafter fully set forth.

In the accompanying drawings: Figure 1 is a view partly in elevation and partly in section, of so much of a locomotive engine as illustrates the application of my invention thereto; Fig. 2, a longitudinal central section, on an enlarged scale, through a locomotive drifting valve mechanism embodying my invention; Figs. 3 and 4, transverse sections, on the lines *x x* and *y y*, respectively, of Fig. 2; Fig. 5, a longitudinal central section through a drifting valve mechanism, illustrating a structural modification; and, Fig. 6, a transverse section through the same, on the line *z z* of Fig. 5.

My invention is herein exemplified as applied in a locomotive engine in which the supply and exhaust of steam to and from the cylinders, 1, are controlled by distribution valves, 2, of the inside admission piston type, which are reciprocated in valve chests, 3, in the cylinder saddles, in the ordinary manner.

Referring first to Figs. 1 to 4 inclusive, in the practice of my invention, I provide a plate, 4, which is supported in any conveniently accessible position on a locomotive engine, as by being secured to the running board or to the boiler. A valve case or chest, 5, is formed integral with, or secured to, the plate, 4, and is connected, on one side, by a supply pipe, 6, with a source of boiler steam supply, which is preferably, as shown, a turret or small dome, 7, on the boiler, communication between the pipe and turret being controlled by a manually operable valve, 7ª. The valve case is connected, on its opposite side, by a delivery pipe, 8, to points in the conduit of communication between the boiler and the valve chests, as, for example, to the discharge side of the superheated steam header, in a superheated steam locomotive, or equivalently, to the side steam supply pipes, 9, leading to the valve chests, as shown.

Communication between the supply and delivery pipes, 6 and 8, which is closed when the locomotive is standing, is controlled by a steam admission valve, 10, which is fitted to operate in the valve case, 5, and, in the instance herein exemplified, comprises three piston heads, *a*, *b*, and *c*, which are formed on or fixed to a body or spool, *d*, and are each provided with packing rings, to make steam tight joints with the bore of the valve case. The admission valve is normally brought to and held in the position shown in Fig. 2, in which it closes communication between ports, *e*, in the valve case, which are open to the supply pipe, and ports, *f*, in said case, which are open to the delivery pipe, by a spring, 11, bearing against the piston, *c*, and against a screw cap, 5ª, closing one end of the valve case.

The steam admission valve, 10, is moved to position to open communication between the supply and delivery pipes, 6 and 8, and thereby to admit steam to the cylinders independently of the main steam supply pipe under the control of the throttle valve, by mechanism which is actuated either by the formation of a partial vacuum in the cylinders or by an accretion of pressure therein, when the locomotive is running with the throttle valve closed, by automatically acting fluid pressure mechanism which will now be described.

A cylinder, 12, which may be descriptively termed the "pressure" cylinder, is formed integral with, or secured to, the plate 4, in line axially with the valve case, 5, and a cylinder, 13, which may be descriptively termed the "vacuum" cylinder, is similarly fixed to the plate, 4, above and parallel with the cylinder, 12. The cylinders, 12 and 13, are fitted with properly packed pistons, 14 and 15, respectively, which are fixed, respectively, on piston rods, 14ª and 15ª, extending outwardly in the direction of the valve case, 5, the outer end of the piston rod, 14ª, normally standing closely adjacent to the piston, a, of the steam admission valve, 10. The ends of the cylinders, 12 and 13, farther from the valve case are closed by heads, 12ª and 13ª, respectively, and, for the purpose of excluding dust, their opposite ends may be closed by heads, 12ᵇ and 13ᵇ, respectively. The end of the piston rod, 15ª, nearer the valve case, is coupled to the upper arm of a double armed lever, 18, journaled on a pin, 18ª, fixed to the plate, 4, and the lower arm of said lever normally stands closely adjacent to the piston, a, of the steam admission valve, 10.

The end of the cylinder, 13, which is closed by the head, 13ª, is connected, by a pipe, 17, with one of the distribution valve chests, 3, of the locomotive, and the end of the cylinder, 12, which is closed by the head, 12ª, is similarly connected with said distribution valve chest, by a pipe, 19, leading from the pipe, 17, into a port in the cylinder head, 12ª. When in normal or inoperative position, the piston, 14, of the pressure cylinder, fits against a seat, 12ᶜ, formed on or fixed to the cylinder head, 12ª, and of substantially smaller diameter than the bore of the cylinder, in order that a higher pressure may be required to start the piston from its seat than to move it further after being unseated. An air port, 13ᶜ, is formed in the head, 13ᵇ, of the vacuum cylinder, 13, for the admission of atmospheric pressure to the right hand side of the piston, 15.

In the operation of the appliance, steam having been admitted to the supply pipe, 6, by opening the valve, 7ª, and assuming the locomotive to be standing, with its throttle valve closed, steam will enter the valve case, 5, through the ports, e, between the pistons, b and c, of the steam admission valve, and these being of equal diameters, the pressures upon them will be equal, and the valve will remain closed, preventing delivery of steam through the pipe, 8. When the throttle is opened, steam will pass therefrom to the side supply pipes, 9, and the valve chests, 3, and thence, through the induction and eduction ports 1ª, to the cylinders, and will also pass though the pipes, 17 and 19, to the pressure and vacuum cylinders, 12 and 13. When the main throttle valve is opened for the running of the locomotive, steam will pass through the pipes, 17 and 19, to the pressure and vacuum cylinders, 12 and 13. The piston of the vacuum cylinder, being in its extreme right hand position, will remain stationary, and the piston of the pressure cylinder 12, will be moved from its left hand to its right hand position, in which movement its rod, 14ª, will similarly move the steam admission valve, 10, the piston, b, of which, will open the ports, e, of the valve case, 5, to the ports, f, thereby opening communication from the steam supply pipe, 6, to the steam delivery pipe, 8, and admitting steam to the valve chests and cylinders, independently of the main throttle valve. The volume of steam so admitted being, however, small, relatively to that admitted by the throttle valve, will be overbalanced by the latter and will not involve any objectionable result.

When the throttle is closed and the movement of the locomotive continues at any substantial degree of speed, as in drifting, if the reverse lever is in short cut off position, so as to effect a comparatively short traverse of the distribution valves, 2, in the usual manner, the compression developed in the valve chests, 3, by the movements of the pistons in the cylinders, will be correspondingly developed in the pipes, 17 and 19, and connected pressure cylinder, 14, and being resisted only by the spring, 11, the piston of the pressure cylinder will remain in its right hand position, maintaining the admission valve, 10, in open position, and boiler steam will continue to be supplied to the cylinders during the drifting of the locomotive.

If the reverse lever is moved to give the distribution valve substantially longer travel and the movement of the locomotive at any substantial speed continues, a partial vacuum would be formed in the valve chests and cylinders, with a corresponding reduction of pressure on the left hand sides of the pistons of the pressure and vacuum cylinders, and the spring, 11, would move the admission valve, 10, to closed position, unless opposed by a resistance greater than the tension of the spring. This resistance is exerted by the piston, 15, of the vacuum cylinder, which, under the conditions then existing, is subject to atmospheric pressure on its right hand side, entering the cylinder through the port, 13ᶜ, and to a partial vacuum on its left hand side. Said piston is thereby moved to its left hand position, and, through the double armed lever, 18, maintains the admission valve, 10, in open position, if already open, or moves it thereto, if in closed position. It will therefore be seen that the appliance effects the admission of steam to the valve chests and cylinders, independently of the main supply past the throttle, by either the formation of a vacuum or by an accretion of pressure, during the drifting of the locomotive.

When the locomotive is standing with its throttle closed, there will be only atmospheric pressure in the cylinders and valve chests, and consequently the same pressure in the pressure and vacuum cylinders. The spring, 11, will, under these conditions, force the admission valve, 10, and the pistons, 14 and 15, into the normal positions shown in Fig. 2, thereby automatically cutting off the independent supply of steam to the main cylinders, 1, through the pipe, 8. This is a matter of substantial importance, as if this independent supply of steam was, through negligence, permitted to continue, the pressure in the cylinders might increase sufficiently to cause the undesired movement of the locomotive, with damaging results. The reduction of effective area of the piston, 14, of the pressure cylinder, by the fitting thereof against the seat, 12ᶜ, when in normal position, with the admission valve, 10, closed, overcomes any tendency to undesired movement of the piston, as might otherwise be caused by a leaky throttle.

Figs. 5 and 6 illustrate a structural modification embodying the same operative principle and effecting the same result, with the further advantage of relieving the piston of the vacuum cylinder from spring resistance. The pressure cylinder, 12, and vacuum cylinder, 13, are substantially similar to those first described, and are similarly mounted upon a supporting plate, 4, and connected by pipes, 17 and 19, with the main cylinders and valve chests of the locomotive. Instead, however, of providing a single admission valve, actuated by the pistons of both the pressure and the vacuum cylinder, two admission valves, 10, each substantially similar to that first described, are, in this construction, secured to the supporting plate, 4, in line axially with the pressure and the vacuum cylinders, respectively. The steam supply pipe, 6, leading from the boiler, is connected by a T fitting, 6ᵃ, to the cases, 5, of the admission valves, and the delivery pipe, 8, is branched to connect both valve cases with the conduit of communication from the throttle valve to the distribution valve chests and cylinders. The piston rods, 14ᵃ and 15ᵃ, of the pressure and vacuum cylinders, are connected to the admission valves with which they are respectively in line, and a light spring, 20, bearing on the piston, 14, of the pressure cylinder is provided for the purpose of returning said piston and the connected admission valve to their normal positions.

The operation of this form of the appliance is similar, in all particulars, to that of the construction first described, the admission of steam to the main cylinders being effected automatically, independently of the supply from the throttle valve, either by the formation of a vacuum or the accretion of pressure in the main cylinders when the locomotive is drifting, and being automatically cut off when the throttle is closed and the locomotive stopped. The independent supply of steam is effected by one or the other of the two admission valves, as the case may be, according to the pressure conditions in the main cylinders.

Experience with superheated steam locomotives has developed that considerable difficulty has been experienced by the carbonization of oil in the cylinders, and that, when drifting, there is a gummy and sticky deposit of oil on the cylinders, and that the adhesion, to this gummy deposit, of dirt drawn into the cylinders when the engine is drifting to any extent with throttle entirely closed, converts it into a composition which rapidly wears away the packing rings and piston heads, and injures the cylinders. It has also been found in practice that a constant small admission of steam to the cylinders tends to insure proper lubrication and prevent the carbonization of the oil, and that good results have been obtained by keeping the throttle slightly open when the engine was drifting. The objections to this latter practice are, however, manifest to those skilled in the operation of locomotives, and it will be equally obvious that these will be avoided by the application of my invention, in the operation of which steam is automatically admitted to the valve chests and cylinders, entirely independently of the throttle valve, when the engine is drifting, whether the distribution valves are operating on a short or a long cut off, and the independent admission is automatically cut off when the engine is standing, with its throttle closed.

I claim as my invention and desire to secure by Letters Patent:

1. In a drifting valve appliance for locomotives, the combination of a passage adapted to establish communication between a locomotive boiler and a distribution valve chest, independently of main steam supply, valve mechanism controlling said passage, actuating mechanism for imparting opening movement to said valve mechanism, and means for automatically subjecting said actuating mechanism either to the action of vacuum or of compression in a valve chest or cylinder of a locomotive, when not under main steam supply.

2. In a drifting valve appliance for locomotives, the combination of a passage adapted to establish communication between a locomotive boiler and a distribution valve chest, independently of main steam supply, valve mechanism controlling said passage, actuating mechanism for imparting movement to said valve mechanism, means for automatically subjecting said actuating mechanism either to the action of vacuum or of compression in a valve chest or cylinder of a locomotive, when not under main steam supply, to effect opening movement of said valve mechanism, and means for automatically imparting closing movement to said valve mechanism when the locomotive is stationary.

3. In a drifting valve appliance for locomotives, the combination of a passage adapted to establish communication between a locomotive boiler and a distribution valve chest independently of main steam supply, valve mechanism controlling said passage, a piston subject on opposite sides to distribution valve chest or cylinder pressure and to spring resistance, an independent piston subject on opposite sides to distribution valve chest pressure and to atmospheric pressure, and means for independently imparting movement from said pistons to said valve mechanism.

4. In a drifting valve appliance for locomotives, the combination of a passage adapted to establish communication between a locomotive boiler and a distribution valve chest independently of main steam supply, valve mechanism controlling said passage, a piston subject on opposite sides to distribution valve chest or cylinder pressure and to spring resistance and adapted to impart opening movement to said valve mechanism by preponderance of pressure over resistance, another piston subject on opposite sides to distribution valve chest or cylinder pressure and to atmospheric pressure and adapted to impart opening movement to said valve mechanism by the formation of a vacuum in a distribution valve chest, and means for independently transmitting movement from said pistons to said valve mechanism.

5. In a drifting valve appliance for locomotives, the combination of a passage adapted to establish communication between a locomotive boiler and a distribution valve chest independently of main steam supply, two admission valves, independently controlling said passage, a piston subject on opposite sides to distribution valve chest or cylinder pressure and to spring resistance and adapted to impart opening movement to one of said admission valves by preponderance of pressure over resistance, another piston subject on opposite sides to distribution valve chest or cylinder pressure and to atmospheric pressure and adapted to impart opening movement to the other admission valve by the formation of a vacuum in a locomotive cylinder, and means for transmitting movement from each of said pistons to one of the admission valves.

6. In a drifting valve appliance for locomotives, the combination of a support, two valve cases connected thereto, a steam supply pipe adapted to communicate with a source of boiler steam supply and leading into each of said valve cases, a steam delivery pipe leading out of each of said valve cases and adapted to communicate with the supply conduit of a distribution valve chest, two admission valves, each fitted in one of said valve cases and controlling communication between the supply and delivery pipes, two valve actuating cylinders connected to the support, each opposite one of the valve cases, pipes establishing communication between one end of each cylinder and a locomotive valve chest or cylinder, pistons fitted in each of the valve actuating cylinders, piston rods transmitting movement from said pistons to the admission valves, and a spring bearing on one of said pistons on the side farther from the pipe leading into said cylinder.

7. In a drifting valve appliance for locomotives, the combination of a passage adapted to establish communication between a locomotive boiler and a distribution valve chest independently of main steam supply, an admission valve controlling said passage, an actuating cylinder, a head closing one end of said cylinder and having a piston seat of smaller diameter than the bore thereof, a pipe leading from an opening in said head to a locomotive cylinder, a piston fitting the actuating cylinder and normally bearing on the piston seat, a rod through which movement of the piston is transmitted to the admission valve, and a spring exerting tension on said piston in direction to move it toward its normal seated position.

WILLIAM H. FOSTER.

Witnesses:
J. SNOWDEN BELL,
EDWARD S. WRIGHT.